United States Patent Office 3,351,449
Patented Nov. 7, 1967

3,351,449
FORCED STREAM FEEDING THROUGH ORIFICE
Raymond R. Ambrogi, Corning, N.Y., assignor to Corning Glass Works, Corning, N.Y., a corporation of New York
Filed June 15, 1964, Ser. No. 375,269
1 Claim. (Cl. 65—122)

ABSTRACT OF THE DISCLOSURE

A method of stream feeding metered charges of low viscosity molten glass to a forming device, wherein the area of the delivery orifice is proportioned to the viscosity of the glass delivered therethrough, so that on the downstroke of an associated needle a desired quantity of glass is forced through the orifice, whereas upon upstroke zero flow is occasioned at the orifice.

---

In the past, it has been customary to deliver molten glass to a forming device, such as a pressing mold, by gobbing the glass into the mold at periodic intervals. However, the gobbing of molten glass has been limited to the extent that the glass must have a delivery viscosity of at least 600 poises and preferably higher. If the viscosity were lower than 600 poises, it would be virtually impossible to establish zero flow and prevent dripping at the orifice, due to the fact that gobbing necessitates relatively large orifice openings.

Experience has shown that in order to produce a gob without flopping or distortion, it is necessary that the gob have a length to diameter ratio $L/D$ of between 1 to 3. Therefore, larger gob weights require larger orifices. As a result, since the minimum diameter of a gobbing orfice is limited by the desired gob weight, this fact also limits the viscosity of the glass which can be held at zero flow at the orifice, since holding time is a function of viscosity over the orifice area. The holding time, therefore, being limited by the viscosity and orifice area, reflects on the production rates which could be economically utilized. If, for instance, a lower production rate were required for a specific operation, it necessitated the discarding of one or moer gob charges thus reducing the production efficiency of the tank by one-half or more.

A further problem encountered with gobbing delivery systems is the fact that since the length to diameter ratio must be maintained from 1 to 3, there is a rather large diameter which must be sheared, producing a correspondingly large shear area which is inherently cooled with respect to the remainder of the gob. This large diameter also produces the large shear marks which may have a tendency to impair the appearance or usefulness of the final product. In addition, the large shear area causes the gob to have uneven temperature distribution which detrimentally affects the pressing of the gob when delivered to a mold, since the cooled shear area does not flow laterally outwardly from the gob at the same rate as does the higher temperature portions of the gob remote from the shear or cut off point.

The squatty configuration of the standard gob does not permit the delivery of a perfectly round charge to the mold, nor does it provide for repetitious positioning of the gob at the desired loading point in the mold. Since the gob is in free suspension at the time of shearing, the shearing operation results in a deflection of the gob from the desired point of contact with the mold, not only as to lateral positionment but also orientation or rotation of the gob during its transfer to the mold. This problem is further accentuated by the fact that the mold has always been placed in an extended spaced-apart relationship below the orifice, due to the desirability of utilizing gravitational forces to force the viscous gob into desired regions of the receiving mold.

The viscosity limitation in gobbing has also been a factor in limiting the thickness of ware which may be pressed. This is due to the fact that pressing thin ware is directly proportional to the viscosity of the glass utilized and inversely proportional to the pressing force. That is, a greater pressing force will provide thinner ware, whereas greater viscosity provides thicker ware. Since there is a limit to the amount of pressing force which may be applied to the ware before detrimental cracks or pressure checks are formed, it is the viscosity of the glass which actually determines the thickness or thinness of the ware to be pressed. Therefore, the final thickness which may be produced is directly a function of viscosity and as pointed out above, this was limited with the previously known gobbing operations.

It has also been known in the optical glass blank art to flow feed glass into a mold blank by allowing it to run out of an orifice. For such purposes, however, the delivery was limited to fairly high viscosity glasses in the neighborhood of about 1000 to 3000 poises. The holding time, if any, was merely a function of the glass viscosity after shearing, since there was no control needle for holding a zero flow. Low viscosity glasses could not be held by this technique, since immediately after shearing flow would again begin before the time in which it was actually desired. A further disadvantage with this type of feeding resided in the fact that since the flow of glass is only dependent on gravity, an extended period of time was required in order to deliver a fairly decent sized charge which could be utilized for other than optical glass blanks. If a larger charge were delivered, the initially delivered glass would set up and cool before the finally delivered glass was actually positioned within the mold, thereby preventing the pressing of a total charge into a final article.

The instant invention obviates the problems heretofore encountered with known techniques of delivering molten glass and presents an improved method of delivering molten glass to a mold positioned immediately below a delivery orifice wherein low viscosity glasses not heretofore controllable may now be utilized in the delivery by intermittently effecting zero flow at the orifice and a forced stream flow therefrom.

It has thus been an object of the invention to provide a method of delivering glass at virtually any viscosity and of any desired weight to a forming operation in very short times.

A further object of the invention has been to provide an improved method of periodically delivering a charge of low viscosity glass within the range of 50 to 1000 poises, at a rate independent of the charge weight.

A further object of the invention has been to provide an improved process for repeatedly delivering a circular charge of molten glass having uniform temperature distribution to facilitate uniform radial flow upon pressing.

A still further object of the invention has been to provide a method of delivering low viscosity glass to a pressing operation to facilitate the pressing of very thin ware of relatively large size.

These and other objects of the invention will become apparent to those skilled in the art from the following disclosure and accompanying drawings in which.

In performing the improved method of this invention, the flow of low viscosity glass from an orifice to a mold positioned immediately therebelow is controlled to intermittently effect zero flow at the orifice and a forced stream flow therefrom delivering a charge to the mold therebelow. The forced stream flow is produced by a downward motion of a needle positioned in the well above the delivery orifice, which is provided with a relatively small diameter opening. The needle is moved in such a manner so that an extended stream of molten glass is squirted from the relatively small diameter opening, wherein the length to diameter ratio of the charge is 15 or greater.

Due to the length of the charge, the initially delivered end of the stream puddles into the mold positioned below the orifice, while the upper end thereof is simultaneously emanating from such orifice. As the stream continues into the initially deposited puddle, the glass radiates equally in all directions radially outwardly from the center thereof so as to provide a perfectly circular patty of molten glass within the mold. This even flow action effects concentric isotherm lines about the molten patty in the mold and promotes uniform distribution about the circular extent of the charge, which results in even outward flow of the charge upon the application of a pressing force.

The charge is separated from the applied body by shearing the stream adjacent the orifice, and the needle moves upwardly to establish zero flow at the orifice. The sheared stream of relatively small area travels downwardly with the remaining portion of the stream into the center of the patty below, again providing for uniform distribution of the glass within the patty. In addition, since the area of shear is extremely small, the amount of cooling produced by the shearing is virtually negligible as compared with that produced in standard gobbing.

The small diameter of the orifice permits the utilization of very low viscosity glasses, which may run as low as about 50 poises. Such low viscosity glasses, in turn, permit the pressing of very thin articles without necessitating large pressing forces. As previously noted, since holding time is a function of viscosity over orifice area, the smaller area permits lower viscosity for the same holding time or production rate, thus allowing time for the positioning of an empty mold under the orifice. In addition, the lower viscosity permits the pressing of thinner ware than previously possible. As an illustration, a ware piece of approximately 12 inch diameter was pressed to a thickness of about 1/16 inch, whereas in the past under similar conditions, the thinnest ware piece of similar size which could be produced was only 3/16 inch.

Figure 1:
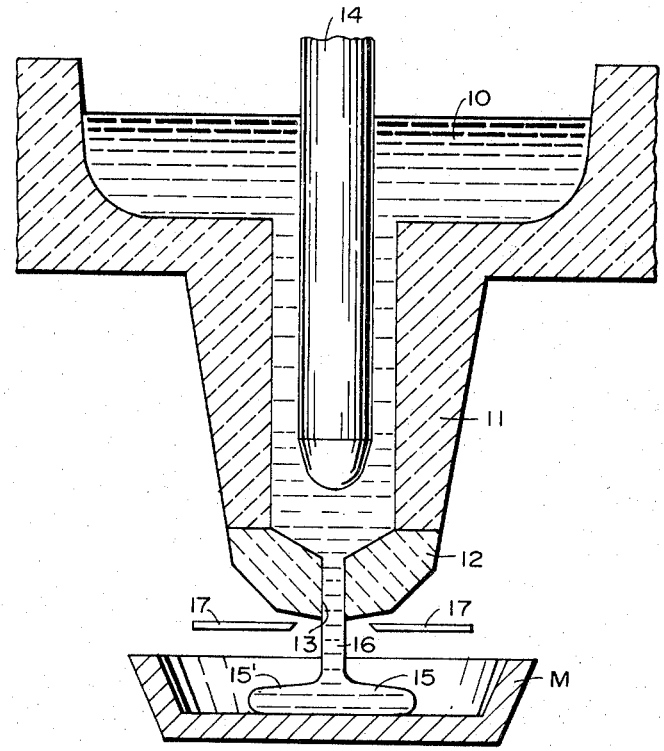
FIGURE 1 is a side elevational view in section illustrating a method embodying this invention of delivering a circular charge of molten low viscosity glass to a mold positioned directly beneath a discharge orifice in such a manner that the charge is squirted or stream fed into the mold.
Figure 2:
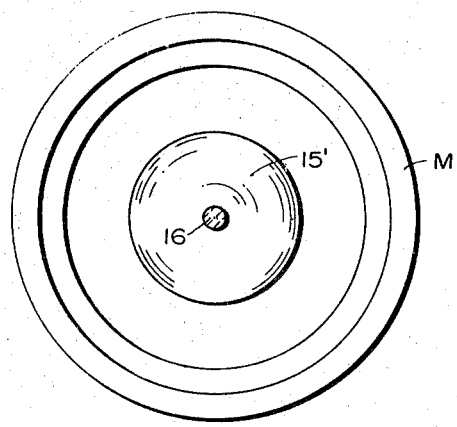
FIGURE 2 is a plan view illustrating the circular geometry of the charge positioned centrally of the mold.

Referring now to the drawing, and particularly FIGURE 1, a supply of molten glass 10 is shown extending downwardly within a well 11 provided with an orifice ring 12 having a relatively small opening or orifice 13. A reciprocal needle 14 projects downwardly into the well for controlling the flow of molten glass through the orifice. A charge 15 of molten glass is shown being delivered to a mold M positioned immediately below the orifice 13. The charge is shown having a circular patty portion 15′ and a stream portion 16 of relatively small cross-sectional diameter which is being forced fed through the relatively small orifice 13. A pair of shear blades 17 are positioned immediately below the orifice to shear the stream 16 and sever the charge from the supply body. As shown in FIGURE 2 the patty 15′ is centrally positioned within the mold M and has a perfect circular geometry.

As the needle 14 moves downwardly within the well 11 a long stream of glass is squirted out of the orifice 13 at a pressure of between about 15 and 30 p.s.i. Due to a close coupling between the needle and the orifice, the downward movement of the needle actually forces the molten glass outwardly through the orifice under pressure of up to about 30 p.s.i., so that a large volume may be dispensed in a rather short time through the relatively small orifice opening. The mold M is held close to the orifice and accumulates the charge in the form of a circular patty, while the stream forming the charge is being continuously dispensed from the orifice. A flow pattern is established in the patty from the center thereof radially outwardly in all directions, thus providing a patty which is not only perfectly circular in geometry but which is thermally uniform about its circular extent. That is, the uniform distribution of flow radially outwardly from the center of the patty in effect produces a plurality of concentric isotherm lines or circles whose temperature values decrease as the diameter of such circles increases.

When a desired weight of molten glass has been dispensed by the downward movement of the needle 14, the shears 17 sever the rather small diameter stream portion 16 of the charge (see FIGURE 2) which falls centrally in the center of the patty 15′. The needle is then moved upwardly in the well, and cooperates with the inner walls thereof to produce a zero net flow of glass in the orifice area. This permits the holding of the glass back at the orifice after the shear cut, for a desired period of time dependent upon the diameter of the orifice and viscosity of glass utilized. Because of the relatively small diameter which may be used with the instant invention, a much lower viscosity glass, such as down to 50 poises, may be delivered while still being able to hold back the glass at the orifice for a reasonable mold-change time such as from one to four seconds.

Since the charge is not dependent upon an $L/D$ factor of between 1 and 3, any reasonable charge weight may be delivered regardless of the viscosity of the glass used. The weight of the charge may be varied as desired by varying the stroke of the needle necessary to squirt out under force a stream of glass necessary to produce the desired weight. Since the charge or patty is repeatedly delivered to a central position in a closely oriented mold and is geometrically and isothermally uniform, it is possible to free press extremely thin articles with high selection without necessitating excessive pressing forces.

Although the parameters of the present process may vary over wide ranges such as the delivered gob weights ranging from 1/4 pound to 30 pounds, the orifice diameters may range from 1/2 inch to 3 inches, the viscosity of the glass delivered may range from approximately 50 poises to 3000 poises, and the time for delivering the charge may vary from 1/10 second to 2 seconds, the following specific example is given merely to illustrate mode of carrying out the invention. A molten glass having a temperature of approximately 1350° C. and a viscosity of about 100 poises was delivered in 1/2 pound charges through an orifice having a diameter of 5/8 inch in approximately 0.2 second. The holding time or zero flow between the various charges was approximately 5 seconds. The charge was delivered to a press which produced a piece of ware 1/16 inch thick and 12 inches in diameter.

Although I have disclosed the now preferred embodiments of my invention, it will be apparent to those skilled in the art that various changes and modifications may be made thereto without departing from the spirit and scope thereof as defined in the appended claim.

I claim:

In the delivery of molten glass downwardly through a needle-controlled orifice, an improved process for delivering metered charges of molten glass having a viscosity below 1000 poises which comprises, moving a needle downwardly within an elongated confined pool of molten glass having a viscosity below 1000 poises and forcing such molten glass downwardly and outwardly through a restricted orifice in a continuous stream, initially puddling such stream in a forming device below such orifice, continuing a constant uniform flow of such stream to maintain the ratio of the overall length of the stream dispensed to its cross-sectional diameter greater than 15 and forming a circular patty centrally of the forming device, shearing such stream immediately below the orifice, and then providing zero flow at the orifice by raising the needle within such confined pool of low viscosity glass to hold the glass at the orifice without flow for a desired period of time.

References Cited

UNITED STATES PATENTS

| | | | |
|---|---|---|---|
| 1,590,924 | 6/1926 | Bridges | 65—129 |
| 2,128,249 | 8/1938 | Honiss | 65—134 X |
| 2,994,161 | 8/1961 | Bair | 25—122 X |
| 3,068,671 | 12/1962 | Young | 65—39 |

FOREIGN PATENTS 131,586  12/1920  Great Britain.

DONALL H. SYLVESTER, *Primary Examiner.*

F. W. MIGA, *Assistant Examiner.*